(No Model.)
J. E. KORDICK.
SELF WATERING TROUGH.
No. 573,005. Patented Dec. 15, 1896.
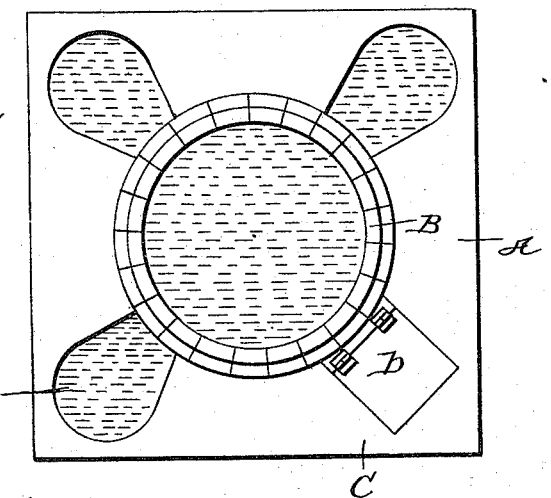
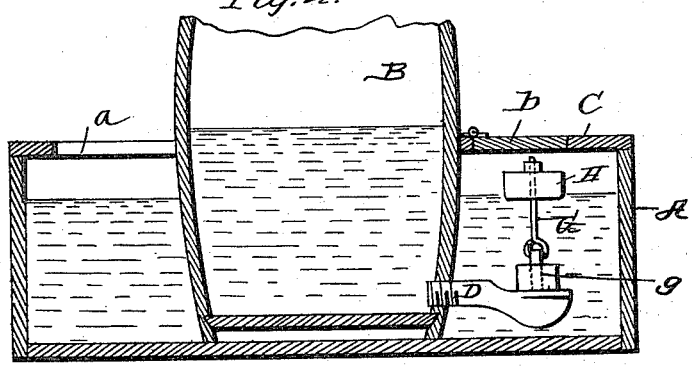
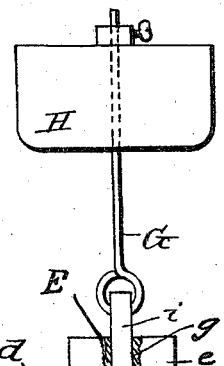
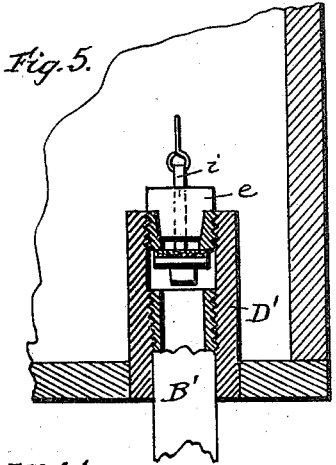
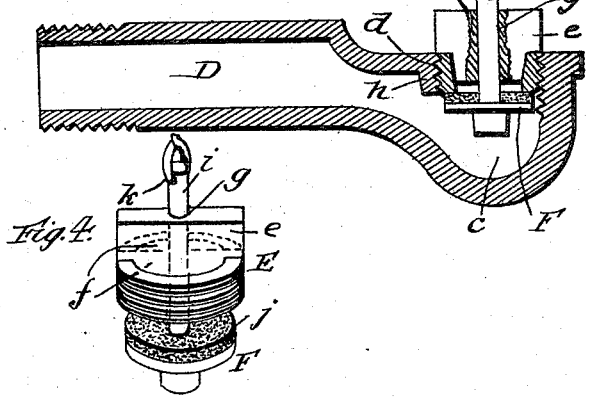
Witnesses:
C. H. Raeder
W. A. James
Inventor
J. E. Kordick
By James J. Shuffy
Attorney

UNITED STATES PATENT OFFICE.

JOHN E. KORDICK, OF BRIDGEWATER, IOWA.

SELF-WATERING TROUGH.

SPECIFICATION forming part of Letters Patent No. 573,005, dated December 15, 1896.

Application filed February 1, 1896. Serial No. 577,701. (No model.)

*To all whom it may concern:*

Be it known that I, JOHN E. KORDICK, a citizen of the United States, residing at Bridgewater, in the county of Adair and State of Iowa, have invented certain new and useful Improvements in Self-Watering Troughs; and I do declare the following to be a full, clear, and exact description of the invention, such as will enable others skilled in the art to which it appertains to make and use the same.

My invention relates to watering-troughs, and more particularly to valves for controlling the passage of water from a source of supply to the trough; and its novelty and advantages will be fully understood from the following description and claim when taken in conjunction with the accompanying drawings, in which—

Figure 1 is a plan view of my improved trough. Fig. 2 is a vertical section of the same. Fig. 3 is an enlarged section illustrating the valve and the float for controlling the passage of water from the source of supply to the trough. Fig. 4 is a detail perspective view of the valve proper and the valve-seat removed from the valve-body, and Fig. 5 is a detail section illustrating my improved valve in conjunction with the induction-pipe of an ordinary windmill-tank.

Referring by letter to said drawings, and more particularly to Figs. 1 to 4 thereof, A indicates a watering trough or tank, which is preferably square, as shown.

B indicates a water-receptacle or source of supply which is arranged in the center of the trough or tank and is designed to be filled and kept filled with water by any suitable means.

C indicates the top of the trough or tank A, which is provided with the openings $a$ to permit animals to drink, and with the door $b$ to permit of ready access being had to the valve, and D indicates the spout for discharging water into the trough or tank A. This spout D is exteriorly threaded at its inner end to engage the threaded aperture in the receptacle B, and at its outer end it is provided with the depending and preferably cup-shaped portion $c$, and is also provided above said cup-shaped portion $c$ with the interiorly-threaded vertically-disposed aperture $d$, as better shown in Fig. 3 of the drawings. The said spout D forms the casing or shell of my improved valve, and in its aperture $d$ is arranged the exteriorly-threaded casting E, which forms the valve-seat. This casting E is provided with the vertically-disposed openings $f$ for the passage of water and with the diametrical wall $e$, which has a central opening $g$ and extends above the annular portion of the casting, as illustrated, so that a wrench may be applied thereto to conveniently turn the casting E when the same is placed in position or removed from the spout D without springing or otherwise injuring any of the parts of valve.

The casting E is screwed into the aperture $d$, preferably until its lower edge is flush with the lower edge of the wall $h$ of the spout, and it is designed to receive in its opening $g$ the stem $i$ of the valve F, which valve F is preferably of circular form and is provided on its upper side with a packing-disk $j$, as shown. The said valve F is designed to seat upwardly against the lower edge of the casting E, which forms the valve-seat, and it is provided in its stem $i$, adjacent to the upper end thereof, with the aperture $k$ to receive the lower end of the rigid rod G, upon which the float H is secured, preferably, in an adjustable manner, as illustrated.

In the practical operation of the invention it will be seen that so long as the water in the trough or tank A is below a certain height the weight of the float H, imposed on the rod G, and in turn on the valve F, will press and hold the valve F away from its seat and against the bottom of the cup-shaped portion of the spout D, so as to permit the water to flow freely up through the openings $f$ in casting E into the trough or tank A. When the water in said tank reaches a certain height, it will raise the float H, which, through the medium of the rod G, will draw the valve F upwardly to and hold it against the valve-seat, so as to prevent any more water from flowing into the trough or tank. In this it will be seen that the float H is assisted by the head of water which, by tending to gain passage through the openings $f$ of the casting E presses upwardly against the valve and securely holds it against its seat and thereby prevents leakage. When a portion of the water is removed from the trough or tank, the float H will fall and will press the valve F away from its seat, so as to permit water to enter the trough or tank until the water in said tank reaches the predetermined height, when the valve will again be pressed and held against its seat by the water raising the float.

It will be appreciated from the foregoing that my improved valve is exceedingly cheap and simple and embodies but a minimum number of parts, none of which are likely to get out of order, and it will also be appreciated that the valve may be quickly and easily put together and as quickly and easily taken apart for repairs. It will also be observed that all of the movable parts of the valve—viz., the valve proper, F, its stem $i$, the rod G, and the float H—rest and move in alinement with each other, and that in consequence the water by raising the float H directly draws and holds the valve against the seat formed by the casting E, in which action it is assisted by the pressure of water against the under side of the valve F. In virtue of this it will also be seen that when water is removed from the trough or tank the weight of the float H is imposed directly on the valve, so that when the float moves downwardly the valve will also be moved downwardly and opened.

In virtue of the rod G being loosely connected to the upper end of the valve-stem and the head of water pressing against the under side of the valve F it will be seen that agitation of the water in the tank and the attendant slight movement of the float will not move the valve F, and in consequence leakage of water into the trough or tank will be effectually prevented.

In Fig 5 I have shown the valve applied to an interiorly-threaded casing D', which receives the induction-pipe B' of the tank of a windmill or other water-elevator.

Having described my invention, what I claim, and desire to secure by Letters Patent, is—

The improved valve for controlling the passage of water from a tank into a watering-trough consisting essentially of the horizontally-disposed spout D, formed in one piece and exteriorly threaded at one end to engage a threaded aperture in the tank and having the depending cup-shaped portion $c$, at its opposite end and also provided in its upper side above said cup-shaped portion $c$, with the interiorly-threaded, vertically-disposed aperture $d$, the casting E having the annular portion provided with exterior threads engaging therewith, the vertically-disposed openings $f$, in the annular portion, and the diametrical wall $e$, arranged between the openings $f$, and extending from a point adjacent to the under side of the annular portion for the application of a wrench and provided with the central vertical opening, the valve arranged below the casting E, and having the central stem arranged and adapted to move in the opening of the diametrical wall and also having packing upon its upper side, the rigid rod loosely connected with the upper end of the valve-stem and the float mounted and secured on said rod, all as and for the purpose set forth.

In testimony whereof I affix my signature in presence of two witnesses.

JOHN E. KORDICK.

Witnesses:
 A. M. REIS,
 FRANK KORDICK.